(12) United States Patent
McQuade et al.

(10) Patent No.: US 8,057,861 B2
(45) Date of Patent: Nov. 15, 2011

(54) REMOVABLE COATING AND APPLICATION METHOD

(75) Inventors: D. Tyler McQuade, Tallahassee, FL (US); Muris Kobaslija, Somerville, MA (US)

(73) Assignee: Cornell University, Ithaca, NY (US)

( * ) Notice: Subject to any disclaimer, the term of this patent is extended or adjusted under 35 U.S.C. 154(b) by 680 days.

(21) Appl. No.: 12/211,318

(22) Filed: Sep. 16, 2008

(65) Prior Publication Data
US 2009/0053497 A1    Feb. 26, 2009

Related U.S. Application Data

(63) Continuation-in-part of application No. 12/146,251, filed on Jun. 25, 2008, now abandoned.

(60) Provisional application No. 60/667,232, filed on Apr. 1, 2008, provisional application No. 60/946,226, filed on Jun. 26, 2007.

(51) Int. Cl.
*B05D 1/36* (2006.01)
*B05D 7/00* (2006.01)

(52) U.S. Cl. ............ 427/402; 427/404; 427/407.1; 427/412.2; 427/417; 427/418; 427/419.5; 427/419.8

(58) Field of Classification Search ............ 427/402, 427/404, 407.1, 412.2, 417, 418, 419.5, 419.8
See application file for complete search history.

(56) References Cited

U.S. PATENT DOCUMENTS

| | | | |
|---|---|---|---|
| 6,653,265 B2 | 11/2003 | Rossi et al. | |
| 2004/0224098 A1 * | 11/2004 | Winterton et al. | 427/430.1 |

* cited by examiner

*Primary Examiner* — Eisa Elhilo
(74) *Attorney, Agent, or Firm* — William Greener; Bond, Schoeneck & King, PLLC (57) ABSTRACT

A removable, colored X-alginate coating composition includes an aqueous solution of sodium alginate including a colorant and an aqueous solution containing divalent cations. The applied coating composition may be in the form of a thin film coating having a thickness of 10 nanometers or more and may include more than a single layer. The X-alginate coating composition is substantially removable from the application surface on-demand using a suitable chelator. A reversible, colored X-alginate coating system includes a colored X-alginate coating composition and a colored X-alginate coating composition remover. The remover may be a chelator. A method for reversibly coloring a surface includes applying an aqueous solution of sodium alginate including a colorant onto the surface and applying an aqueous solution containing divalent ions onto the surface. Water may subsequently be applied to the coated surface as a final washing step.

33 Claims, 10 Drawing Sheets

REMOVABLE COATING AND APPLICATION METHOD

RELATED APPLICATION DATA

The instant application is a continuation-in-part of U.S. Ser. No. 12/146,251 filed on Jun. 25, 2008 and claims priority thereto as well as to U.S. provisional application Ser. No. 60/667,232 filed on Apr. 1, 2005 and U.S. provisional application Ser. No. 60/946,226 filed on Jun. 26, 2007, to the fullest allowable extent, the subject matters of which are incorporated herein by reference in their entireties as though fully set forth herein.

FEDERALLY SPONSORED RESEARCH

This invention was made with government support under Contract No. W911NF-06-1-0315 sponsored by the U.S. Army (ARO). The government may have certain rights in the invention.

BACKGROUND

1. Field of the Invention

Embodiments of the invention are generally directed to the field of colored coatings and, more particularly, to an environmentally benign, readily removable, colored coating composition, a method for its application to and removal from a surface, and applications thereof.

2. Related Art Discussion

Figure 1:
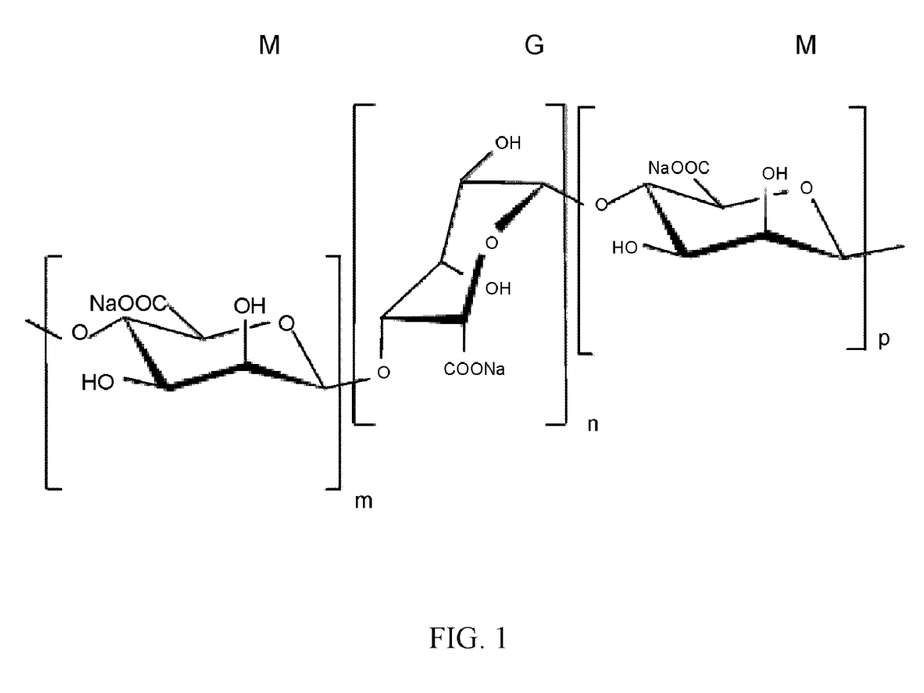

Sodium alginate is an anionic linear polysaccharide composed of (1-4)-linked D-mannuronic and L-glucuronic acid repeat units as depicted in FIG. 1. These sugar residues can either be arranged in blocks or they can be randomly distributed. Substances containing divalent cations (e.g., calcium, magnesium, others known in the art) can chelate carboxylate groups and make crosslinks between chains, forming an insoluble, non-thermo-reversible hydrogel, e.g., calcium alginate.

Calcium alginate can be used, for example, to make microcapsules for drug delivery and immobilization of biocatalysts, coatings for medical implants, food thickeners and coatings, textile print thickeners, and for other applications where its unique barrier, ion chelating, and biocompatible properties may be useful.

Calcium alginate is a firm, clear, and quick-setting gel that is generally physically stable and flexible when dried. Calcium alginate can be synthesized by combining aqueous sodium alginate and calcium chloride (or other divalent ion) solutions; e.g., calcium complexes such as calcium carbonate and calcium chlorate. Other elements containing divalent cations may include, without limitation, magnesium, manganese, iron, zinc, mercury or non-metal ions such as paraquat; and their combination with sodium alginate may produce hydrolgel compositions suitable as a removable coating, however, not necessarily non-toxic or environmentally friendly. The stability of calcium alginate hydrogel depends on the stability of calcium complexes within the gel. Thus chelating agents that strongly bind calcium (or other elements containing divalent cations) may quickly solubilize the hydrogel. Exemplary compounds that are capable of such quick calcium (and related substance) removal may include, but are not limited to, sodium citrate, disodium ethylenediamine tetraacetate (EDTA), ethylene glycol tetraacetic acid (EGTA), polyanions such as polyvinylacetate, and high concentrations of ionic solutions such as, e.g., sodium thioglycolate and others known in the art.

U.S. Pat. No. 6,653,265 discloses, among other things, a removable marking system. The system comprises a removable paint formulation comprising zinc oxide, water and an adjuvant, and an aqueous removal formulation having a pH of about 4 to 8, comprising an acid and a buffering agent. The background subject matter disclosed in the '265 patent is incorporated by reference herein in its entirety to the fullest allowable extent.

The inventors appreciate that there may be benefits and advantages associated with removable (or, alternatively, reversible) colored coatings, especially those that are non-toxic, biodegradable and environmental benign. More particularly, there are benefits and advantages associated with such colored coatings that can be applied and removed (reversed) essentially on-demand. Non limiting examples of applications of such coatings may include temporary field lines and logos for sports complexes and roadway markings, as well as coatings for plants, fruit, and skin surfaces.

SUMMARY

An embodiment of the invention is a removable coating comprising a polyanion and any oppositely charged multi-valent species crosslinked thereto. The coating may further include a colorant.

An embodiment of the invention is a method for producing a removable coating comprising combining a polyanion and any oppositely charged multi-valent species. According to an aspect, a colorant is added to the coating via covalent or non-covalent association.

An embodiment of the invention is directed to a removable, colored X-alginate coating composition for a surface that includes an aqueous solution of sodium alginate and an aqueous solution containing divalent cations. Elements (X) containing divalent cations include, without limitation, calcium, magnesium, manganese, iron, zinc, mercury, and non-metal ions such as paraquat. Although embodiments of the invention may include any of these divalent elements, calcium and magnesium are particularly advantageous due to their relatively benign nature. Thus particularly advantageous but non-limiting aspects of the invention include aqueous solutions of calcium chloride, calcium carbonate, calcium chlorate, magnesium chloride, magnesium carbonate, and magnesium chlorate. For the sake of simplicity, the embodiments of the invention disclosed herein below will be described in terms of a calcium alginate coating product, while not being limited to such as a person skilled in the art would understand. According to an aspect, the calcium alginate coating product includes a 'colorant,' which, as used herein, broadly refers to any pigment or particle that is dispersible in a polymer solution, including, but not limited to, colorants, color modifiers (e.g., carbon black), nano particles, nanotubes, metals, soluble dyes, and insoluble pigments. According to an aspect, the applied coating product is in the form of a thin film.

The coating product as described herein may be applied to, and removed from, a surface by various methods including spraying, painting, dipping, dunking, and other known application methods using suitable application apparatus.

An embodiment of the invention is directed to a nontoxic, biodegradable, colored X-alginate coating composition that is readily removable (reversible) upon treatment with a suitable chelator. Non-limiting examples of suitable chelators include disodium ethylenediamine tetraacetate (EDTA), ethylene glycol tetraacetic acid (EGTA), and sodium citrate.

An embodiment of the invention is directed to a reversible, colored X-alginate coating system that includes a colored X-alginate coating composition and a X-alginate coating composition remover. As referred to above, X refers to calcium, magnesium, manganese, iron, zinc, mercury, and non-metal ions such as paraquat.

An embodiment of the invention is directed to a method for reversibly coloring a surface, comprising applying an aqueous solution of sodium alginate including a colorant onto the surface and applying an aqueous solution containing divalent cations onto the surface, wherein the solutions are in mutual contact on the surface. According to a non-limiting illustrative aspect, the aqueous solution containing divalent cations is calcium chloride.

An embodiment of the invention is directed to a method for reversibly coloring a surface, comprising applying an aqueous solution of X-alginate including a colorant onto the surface and removing the colored solution as desired using a chelating agent.

BRIEF DESCRIPTION OF THE DRAWINGS

FIG. 1 is a schematic chemical representation of sodium alginate structural units; M, D-mannuronate residue; G, L-glucuronate residue FIGS. 2A, B, C are serial photo-illustrations showing the removal of a logotype (colored with red food color) from an artificial turf surface: (A) dried logotype before the treatment, (B) letter "C" sprayed with 0.1M EDTA solution and letter "U" sprayed the same way only with water, and (C) total removal of "C" with a water wash while "U" remains visible on the surface, according to an illustrative embodiment of the invention;

DETAILED DESCRIPTION OF EMBODIMENTS OF THE INVENTION

All materials (chemicals, hardware, etc.) associated with the various embodiments of the invention are commercially available. For example, sodium alginate (from *Macrocystis pyrifera* (Kelp), low viscosity (2% solution at 25° C.: 250 cps), and Reactive Green 19 (practical grade) were obtained from Sigma-Aldrich. Red food color (containing water, propylene glycol, FD&C Reds 40 and 3, and propylparaben as a preservative) was a McCormick product purchased in a local supermarket. Calcium chloride (anhydrous, 4-20 mesh pellets) and disodium ethylenediamine tetraacetate (EDTA) were obtained from Fisher Scientific. Artificial turf was obtained from Re-Markable Paint Company (Ithaca, N.Y.).

In the illustrative description to follow, one solution of sodium alginate was used to prevent different extents of gelation between samples.

In turf tests, a TLC sprayer (Kontes, part #422501-0125) was used to disperse sodium alginate solution colored with red food color. Air-pressure was provided by a pump. A syringe pump was used in the preparation of beads.

Scanning electron microscopy images were obtained on a Leica 440 SEM at the Cornell Center for Materials Research. Both film and beads were characterized at 25 kV after sputter coating with palladium gold. Optical microscopy images of hydrated beads were obtained on a Leica DMIL with a mounted Sony DSC-F717 digital camera.

ImageJ software (NIH, http://rsb.info.nih.gov/ij/) was used to measure perimeters (px) of calcium alginate beads. Using Microsoft Excel, bead perimeters were converted to diameters (μm), and the mean size and standard deviation were calculated.

Electronic absorption (UV) spectra were recorded on a Cary 50 Bio UV/Vis spectrophotometer.

The following description and associated figures illustrate the creation and study of a nontoxic, biodegradable coating using calcium alginate including a colorant in support of various embodiments and aspects of the invention, which will thereafter be set forth.

Experiments were performed in support of the embodiments of the invention. These included analyses of leaching and degradation. For the leaching study, a calcium alginate film was prepared as follows: Sodium alginate (1% aqueous solution w/v) containing reactive green 19 (1 g/L) was dispersed onto a piece of artificial turf previously sprayed with an aqueous solution of calcium chloride (0.1 or 2.0 M). The calcium chloride solution was applied using a simple hand-held spray bottle, whereas the alginate solution was sprayed using a TLC sprayer air pressured by a pump. Upon drying, pieces of the film were removed and used in the leaching study.

In the leaching study, a piece of film (average area 56 $mm^2$) was placed in a vial and filled with water (1 mL). Absorbance at 624 nm was measured at 5, 10, 15, 30, and 60 min time marks. At 1 h time mark, EDTA solution (1 mL, 0.5M, made in basic water to promote dissolution) was added, and the film was dissolved. Final absorbance (multiplied by a factor of 2 to adjust for volume change) was considered to be 100% dye leaching. All previous measurements were normalized to this value. In a separate experiment, it was determined that calcium cations, when present in high concentration (approx. 3.0 M), can lower the absorbance of the dye to about 95% of its value. This, however, was not of a concern since this concentration of calcium was never detected upon degradation of the highest cross-linked beads. All other components of the assays (alginate, EDTA, basic water) were found to have no effects on the absorbance of the reactive green 19.

Figure 5:
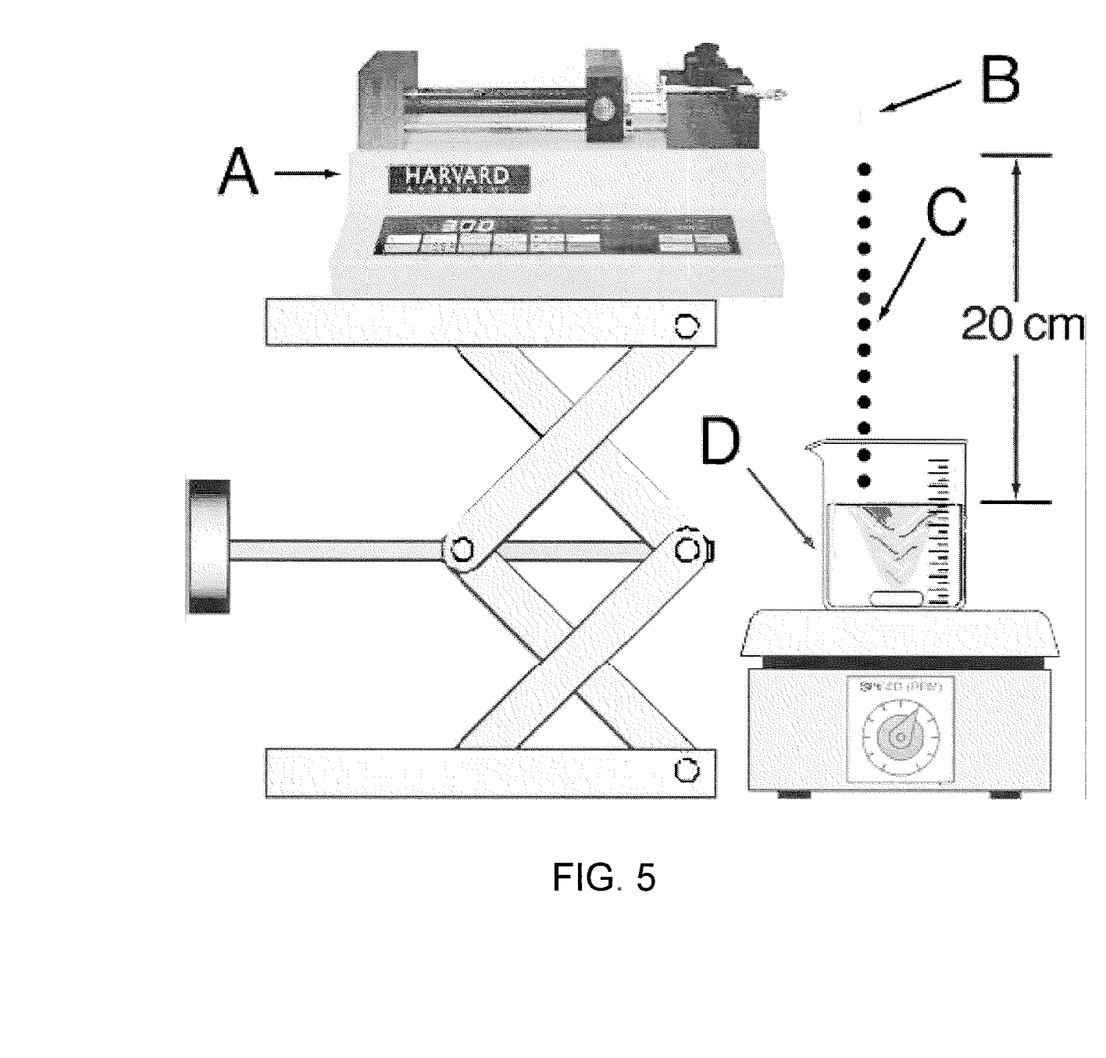
FIG. 5 is a diagrammatic sketch illustrating a method of alginate bead preparation, in support of embodiments of the invention, where: (A) syringe pump at flow rates of 1-3 mL/min, (B) 27 or 30 gauge needle bent at 90° angle, (C) extruded 1% sodium alginate/dye aqueous solution, and (D) receiving bath of 0.1M to 2.0M $CaCl_2$ stirring at 200 rpm.

For the degradation study, calcium alginate beads were prepared as illustrated by the set-up 500-1 in FIG. 5 as follows: An aqueous sodium alginate solution (1% w/v) containing Reactive Green 19 (1 g/L) 501 was extruded through a 27 or 30 gauge needle 503 (at 1.0 mL/min or 3.0 mL/min pumping rate) using a syringe pump 505 from a distance of 20 cm into a calcium chloride solution (0.1M, 1.0M, or 2.0M) 507 stirred at 200 rpm in a crystallization dish (Kimax, 90×50). The amount of beads produced was controlled by regulating the amount of time the pump was operating (i.e., at 1.0 mL/min and 30 s of extrusion the amount of beads corresponded to 0.5 mL of sodium alginate used). The resulting beads were allowed to harden for 30 min before being used in the degradation study.

In the degradation study, each sample contained an amount of beads corresponding to 0.5 mL alginate (30 s of extrusion at 1 mL/min) except for the samples in the assay investigating degradation rate as a function of size. In that case, the amount of beads corresponding to 1.5 mL of alginate was used (30 s of extrusion at 3 mL/min or 90 s of extrusion at 1 mL/min). Hardened, hydrated beads were placed in a filter syringe and strained. At time zero, EDTA (5 mL, solution in basic water; see FIG. 8B for concentration) was drawn into the syringe, and an absorbance measurement was taken at regular time intervals. The highest absorbance (corresponding to the total dissolution of all beads) was considered to be 100% bead degradation. All measurements within the same sample were normalized to this value. The final absorbance was not significantly affected by the presence of EDTA and calcium cations, as discussed further below.

The basis of the experimental study was to make and remove a colored coating from an artificial turf surface. FIGS. 9A-D illustrate a coating process according to an embodiment of the invention, where: (A) an aqueous $CaCl_2$ solution is sprayed onto the surface, (B) a mask (template) is placed on the turf, (C) a colored alginate solution is sprayed over the template, and (D) a logotype is revealed upon mask removal.

Figure 2A:
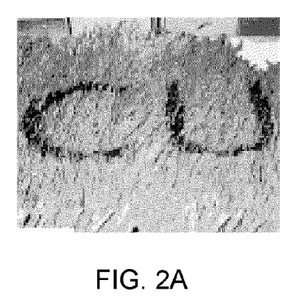
Figure 2B:
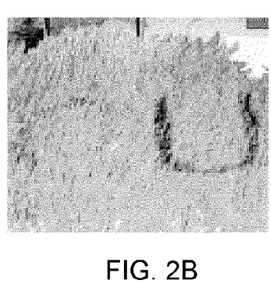
Figure 2C:
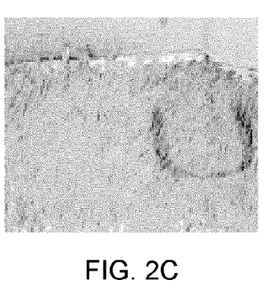

A surface coated with $CaCl_2$ (gelling agent) was sprayed with an aqueous sodium alginate solution containing dye. An air-pressurized atomizer was used to disperse the alginate solution into very fine droplets of gel (<10 μm as determined by scanning electron microscopy). These droplets then coalesced into a thin film. The dried image composed of a colored alginate thin film was stable to a water jet and would not come off until the image was treated with an aqueous solution of EDTA. Application of EDTA acts to remove calcium ions from the gel's interior, the soluble residue of which can be washed away the with water. FIG. 2 provides an exemplary illustration of removal of a logotype colored with Red Food Color from the artificial turf surface. FIG. 2A shows the dried logotype before treatment. FIG. 2B shows the logotype after the letter "C" was sprayed with 0.1M EDTA solution (using a hand-held spray bottle) and the letter "U" was sprayed the same way with water only. FIG. 2C shows the logotype after a water wash spray was applied with a hand-held spray bottle. The letter "C" was totally removed while the letter "U" remained visible on the surface. Simple water spray treatment only slightly faded the letter "U".

Figure 3A:
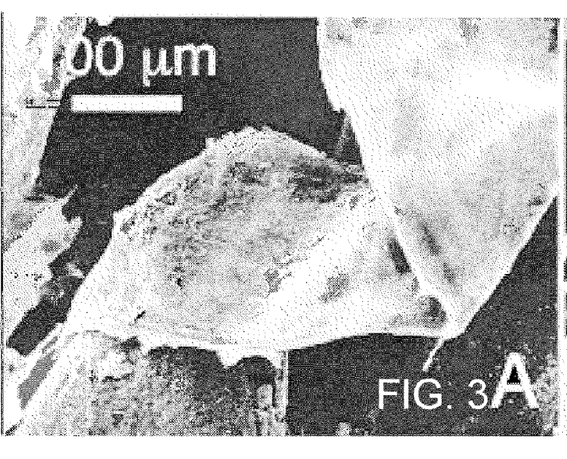
FIG. 3A is a SEM micrograph of an alginate film lifted off of an artificial turf surface after drying.
Figure 3B:
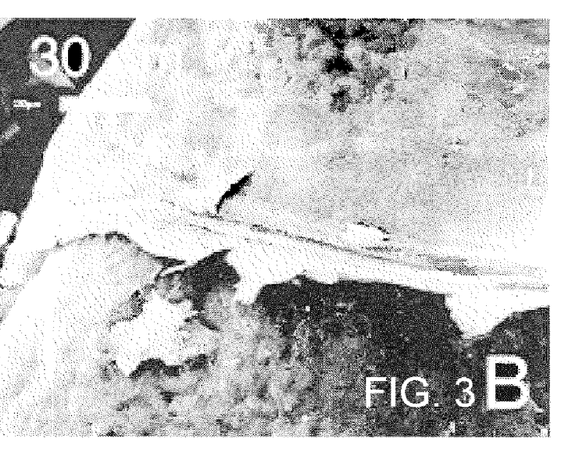
FIG. 3B shows a higher magnification of the same micrograph, according to an illustrative embodiment of the invention.

The calcium alginate film that was spray-cast was examined using scanning electron microscopy (SEM). FIGS. 3A, B are SEM micrographs of an alginate film lifted off of the artificial turf surface after drying. (FIG. 3B is a higher magnification of micrograph 3A). The images at low magnification revealed a smooth, generally featureless surface. At the higher magnification, the image exposed outlines of spheres on the surface, suggesting that the film was comprised of coalesced droplets. As previously hypothesized, the calcium alginate film consists of intergelated, micron-sized beads that form from the spray cast by the atomizer (TLC sprayer).

Figure 4:
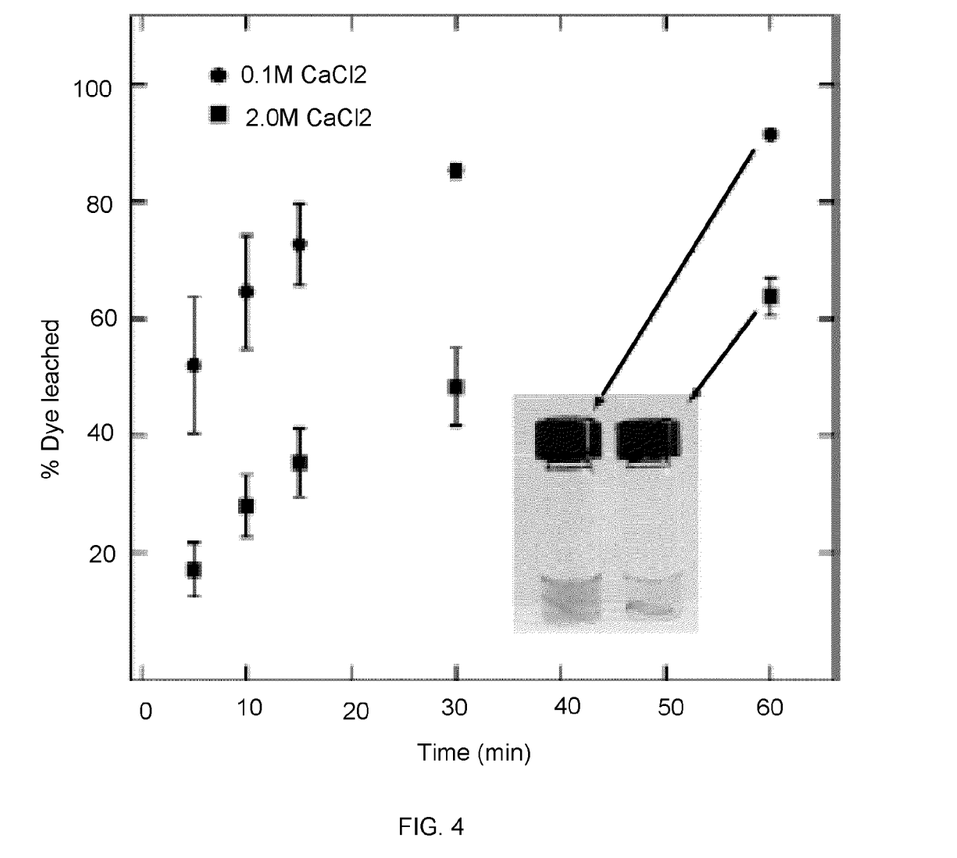
FIG. 4 shows a bar graph illustrating the relative rate of leaching of a dye out of the films lifted off the artificial turf as in FIG. 3A, as a function of $CaCl_2$ concentration, according to an illustrative embodiment of the invention.

Our experiments further investigated the influence that cross-linking has on dye leaching from the alginate films. Two alginate coatings containing the dye reactive green 19 were spray cast onto artificial turf already spray-coated with two different $CaCl_2$ concentrations, 0.1 and 2.0 M. The resulting thin films, upon drying, were scraped from the turf and used in the leaching assay. The leaching assay subjected these films to a situation comparable to 5/16 in. (0.8 cm) of rain falling onto a field without drainage. The results are reported in FIG. 4, which shows the relative rate of leaching of the dye out of the films lifted off the artificial turf as a function of $CaCl_2$ concentration, and confirmed the hypothesis that the films with a higher degree of cross-linking would leach more slowly. Within 1 hour, 91% of the dye had leached out of the 0.1 M $CaCl_2$ cross-linked film, whereas 64% of the dye had leached out of the 2.0 M $CaCl_2$ cross-linked film. This difference was visible to the naked eye, as shown by the image inset within FIG. 4. The amount of cross-linking had an influence not only on the leaching rate but also on the morphology of the formed films. Upon drying on the turf, the 0.1 M $CaCl_2$ cross-linked film was brittle and could be easily removed, whereas the 2.0 M $CaCl_2$ cross-linked film adhered well and was difficult to remove from the turf. An important consideration for removable coating applications pertains to the quality of the coating as well as rapid degradation. The large error bars at early time points in FIG. 4 indicate that the consistency of the film depended not only on the operator of the atomizer but on the cross-linking as well. The variability of film thickness plays a large role in the relative rates of leaching. Dye located within the middle of the thicker portion of the film would be expected to leach more slowly.

The degradation rate and its dependence on the amount of cross-linking, the amount of chelating agent used to degrade the coating, and the relative morphology of the coating were investigated in regard to calcium alginate properties relevant to removable colored coatings. Since films are inherently more difficult to study relative to beads, as evidenced in the relatively large error associated with the leaching studies, a model system that used well-defined beads was chosen.

Figure 6:
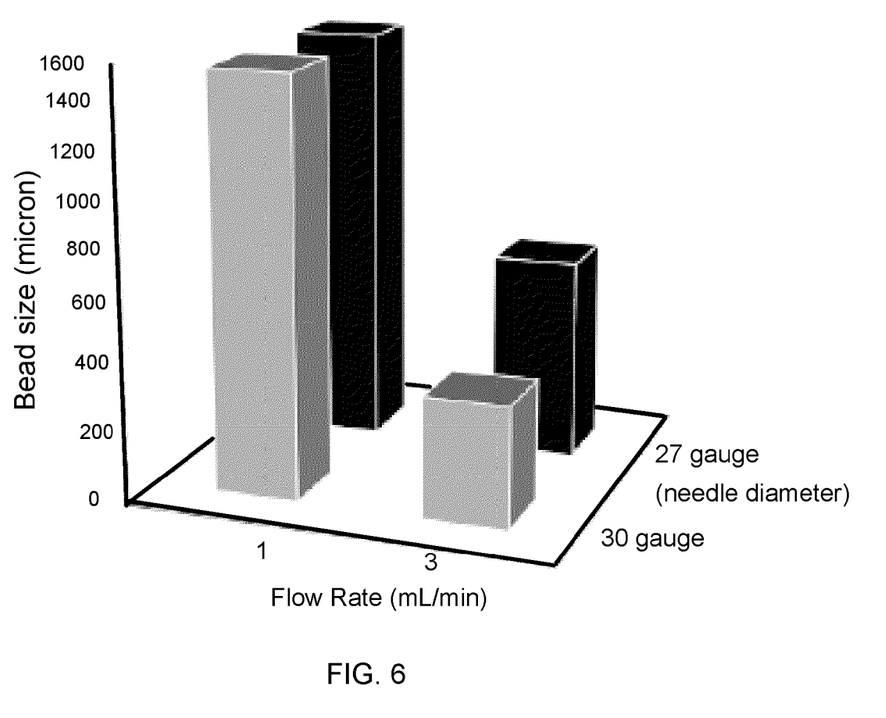
FIG. 6 is a bar chart showing bead size as a function of flow rate and extrusion needle diameter, in support of embodiments of the invention.

Calcium-alginate beads were prepared using a dripping method as described above with reference to FIG. 5. As shown in FIG. 6, at a flow rate of 1 mL/min, the calcium alginate bead size is constant as a function of needle inner diameter (ID). At a slow flow rate (1 mL/min), we obtained beads with an 8% coefficient of variation (CV). At a higher flow rate (3 mL/min), the bead size was dependent on the needle ID. The size of the extruded droplet (and subsequently the size of the bead formed) was smaller in the case of the smaller needle diameter. The ability to decrease bead size at a higher flow rate was offset by the higher CVs of 16% and 23% observed for 27 and 30 gauge needles, respectively.

Figure 7A:
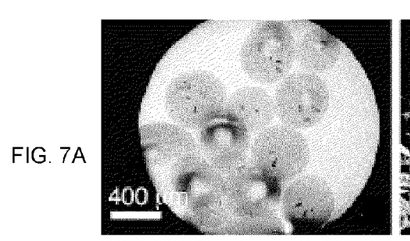
FIG. 7A is an optical micrograph of alginate beads.
Figure 7B:
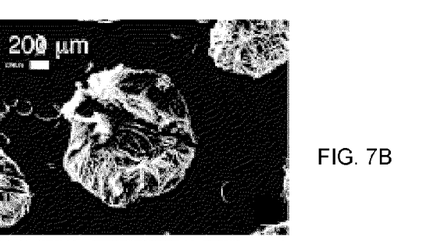
FIG. 7B is a SEM micrograph of lyophilized beads.
Figure 7C:
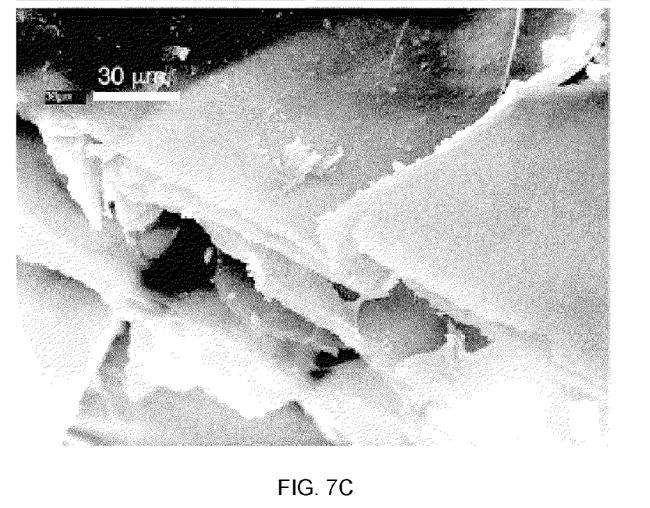
FIG. 7C shows a detail of a bead's cross section made by a razor blade, in support of embodiments of the invention.

The beads were examined by light and scanning electron microscopy as shown in FIG. 7, where FIG. 7A shows an optical micrograph of alginate beads; FIG. 7B shows an SEM micrograph of lyophilized beads; and FIG. 7C shows a detail of a bead's cross section made by a razor blade. Light microscopy of the freshly prepared, hydrated beads revealed a generally spherical shape and smooth surface. Insoluble debris that was visible inside the beads was due to the encapsulated dye (reactive green 19), which was obtained as practical reagent grade. The SEM image (FIG. 7B) of the lyophilized beads also exposed a smooth but wrinkled surface. Cross-sectioned beads, however, revealed a complex onion-like layered structure. The complexity of this structure suggests that both the formation and drying (lyophilization) processes happen in stages.

Figure 8A:
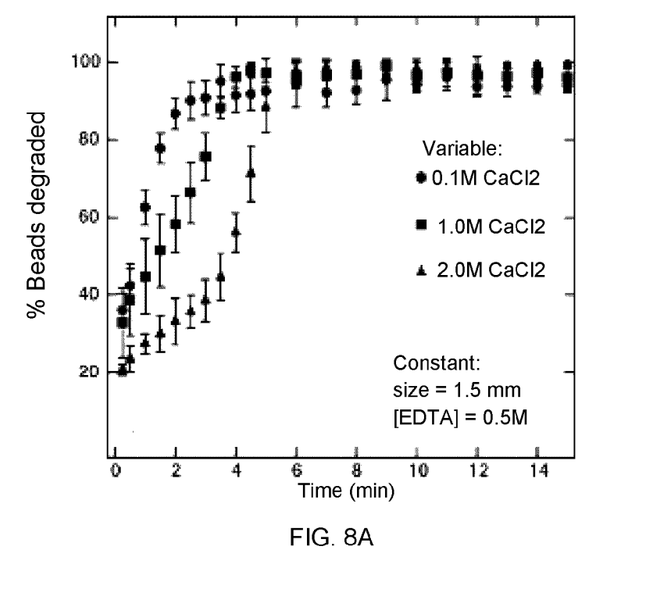
FIG. 8 comprises graphs demonstrating degradation studies of alginate beads as a function of (A) $CaCl_2$ concentration, (B) EDTA concentration, and (C) average bead size, in support of embodiments of the invention.
Figure 8B:
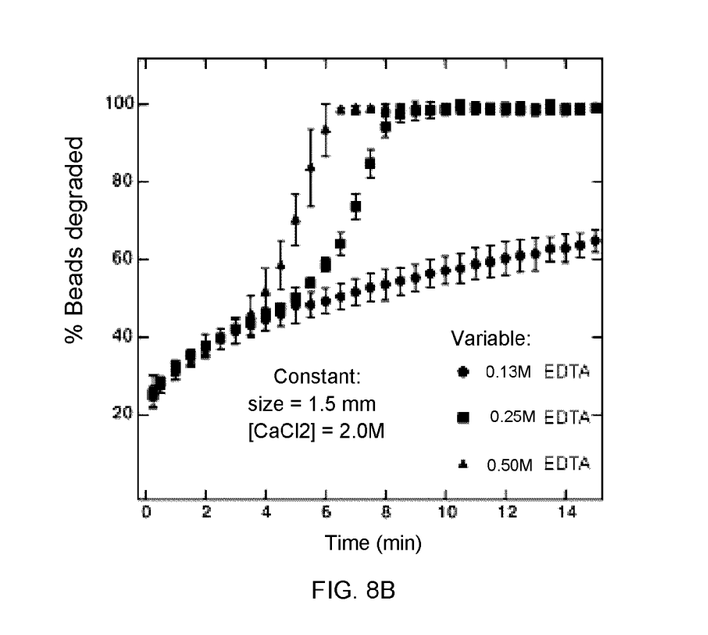
Figure 8C:
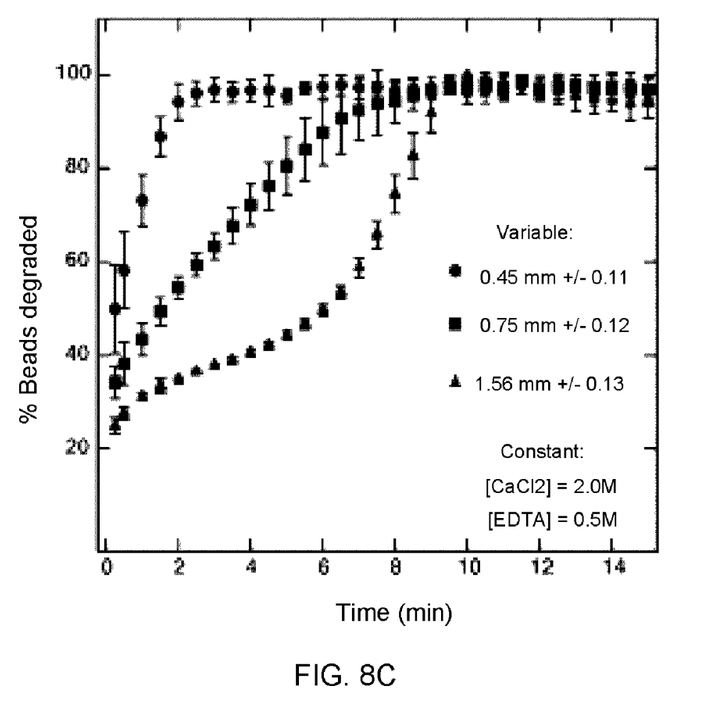
Figure 9A:
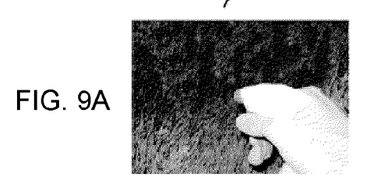
FIGS. 9A-D illustrate a coating process according to an embodiment of the invention, where: (A) an aqueous $CaCl_2$ solution is sprayed onto the surface, (B) a mask (template) is placed on the turf, (C) a colored alginate solution is sprayed over the template, and (D) a logotype is revealed upon mask removal.
Figure 9B:
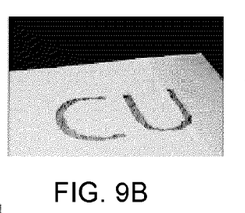
Figure 9C:
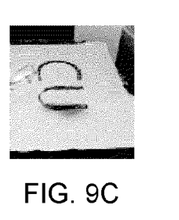
Figure 9D:
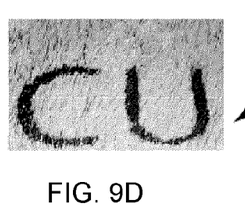

FIGS. 8A, B, C show the results of degradation studies of calcium alginate beads as a function of $CaCl_2$ concentration, EDTA concentration, and bead size on degradation rate, respectively. First, the concentration of $CaCl_2$ used to cross-link the beads was varied, while the size of the beads and concentration of EDTA was held constant (FIG. 8A). Each sample contained an amount of beads corresponding to 0.5 mL of alginate extruded. Dye released from the interior of the beads due to degradation was detected in the supernatant as a function of time using UV/vis spectroscopy. Beads with higher cross-linking took longer to dissolve and release the contained dye. Time of dissolution was very short, and in all three cases, EDTA was used in excess. Absorbance maxima, corresponding to total dissolution of dye-impregnated beads, correlated with the time where no more beads could be visually observed. This absorbance maximum, as evident from the plot, was stable from that point on, indicating that the degradation process was complete.

It was believed that the EDTA concentration would greatly influence the degradation rate of calcium alginate beads. Subsequently, the concentration of EDTA was varied while all other variables were held constant and the rate of degradation of calcium alginate beads was measured (FIG. 8B). As before, the amount of beads used in each sample corresponded to 0.5 mL of alginate extruded. As we expected, higher concentrations of EDTA promoted faster bead degradation. In the case of 0.13 M EDTA (FIG. 8B), the EDTA concentration was too low and the beads did not disassemble and dissolve completely in 15 min. The rise in absorbance over time was due to diffusion and partial dye release.

Another parameter affecting the degradation rate is the size of the beads that are being degraded. In a third assay of the degradation rate, the size of the beads was varied while all other parameters were held constant (FIG. 8C). It is known that smaller beads degrade faster than larger beads. Our system as well demonstrated the slower degradation rate of large (1.5 mm) beads in comparison to the medium (0.7 mm) and small-sized (0.5 mm) beads. For this assay, three times the amount of beads were used than for A or B (corresponding to 1.5 mL of alginate extruded); hence, the comparable degradation curve was slower than in A or B. This is further evidence that the degradation rate depends not only on the accessibility of the calcium ions to EDTA molecules but on the relative amounts of reagents as well.

The shape of the degradation curves was also investigated. Although small and large beads had degradation curves with sharp transitions just before total dissolution, medium-sized beads showed gradual degradation without the sharp transition. This was believed due to the pulsatile nature of release as shown in the published literature. For large beads, the majority of calcium ions were located in the outer shell, whereas the majority of the dye was located in the middle of the bead in a semigel, semiliquid environment. Once EDTA chelated most of the outer shell calcium ions, this interior spilled out immediately. In the case of the medium-sized beads, this pulsatile release was absent due to the high coefficient of variation of the size, which prevented uniform degradation and therefore prevented this sharp transition to occur.

The foregoing discussion of the use of calcium alginate beads provides examples and demonstrations illustrative of the properties and characteristics applicable to the various embodiments according to the invention. Particular applicability having various benefits and advantages may be in the form of calcium alginate films and coatings not necessarily associated with calcium alginate beads.

A non-limiting, exemplary embodiment of the invention is directed to a removable, colored calcium alginate coating composition for a surface. The coating composition includes an aqueous solution of sodium alginate including a colorant and an aqueous solution of calcium chloride. (As disclosed above, in non-limiting, alternate, exemplary aspects, the alginate may be complexed with other forms of calcium or other divalent ions like magnesium, manganese, iron, zinc, mercury). In an aspect, the coating composition comprises a pre-application combined mixture of the aqueous solutions of sodium alginate and calcium chloride. According to an alternative aspect, the coating composition comprises a post-application combined mixture of the aqueous solutions of sodium alginate and calcium chloride.

According to a particular aspect, the applied coating composition is in the form of a thin film coating. More particularly, the thin film may have a thickness about equal to or greater than 10 nanometers. The thin film coating may include more than a single layer; for example, two monolayers, but not limited as such. Any one of the plurality of monolayers may have a thickness about equal to or greater than 5 nanometers.

Advantageously, the calcium alginate coating composition according to the embodiments of the invention is substantially removable from the application surface on-demand.

In a particular aspect, an aqueous solution of sodium alginate may have a concentration between one millimolar (mM) and saturation. Similarly, an aqueous solution of calcium alginate may have a concentration between 1 mM and saturation.

The composition of the coating composition according to the illustrative embodiments of the invention renders the composition essentially non-toxic and bio-degradable.

An embodiment of the invention is directed to a reversible, colored calcium alginate coating system. The system includes a colored calcium alginate coating composition and a colored calcium alginate coating composition remover. In an aspect, the remover is disodium ethylenediamine tetraacetate (EDTA). The EDTA remover may be in the form of an aqueous solution of EDTA having a concentration between about 0.005 mM and saturation. In alternate aspects, the remover may be sodium citrate or EGTA.

An embodiment of the invention is directed to a method for reversibly coloring a surface. The method includes the steps of applying an aqueous solution of sodium alginate including a colorant onto the surface and applying an aqueous solution of calcium chloride onto the surface, wherein the solutions are in mutual contact on the surface. In an aspect, the method may comprise applying the aqueous solution of calcium chloride onto the surface and subsequently applying the aqueous solution of sodium alginate including the colorant onto the surface in contact with the applied calcium chloride. In another aspect, the method may comprise applying the aqueous solution of sodium alginate including the colorant onto the surface and subsequently applying the aqueous solution of calcium chloride onto the surface in contact with the applied sodium alginate. In another aspect, the method may comprise combining the aqueous solution of sodium alginate including a colorant and the aqueous solution of calcium chloride and subsequently applying the combination solution to the surface within a predetermined period of time. In another aspect, the method may comprise substantially simultaneously applying the aqueous solution of sodium alginate including the colorant and the aqueous solution of calcium chloride onto the surface such that both solutions are in contact on the surface.

According to various, non-limiting aspects, application methods may include spraying, painting, pouring, coating, dunking, and dipping.

Once the coating composition has been applied to a surface, a divalent ion chelator (e.g., an aqueous solution of EDTA) may subsequently be applied to the surface in contact with the sodium alginate and calcium chloride solutions to effect removal of the coating. Thereafter, water may be applied to the coated surface as a washing step.

An embodiment of the invention is directed to a method for reversibly coloring a surface. The method includes the steps of applying an aqueous solution of calcium alginate including a colorant onto the surface. The method may further comprise subsequently applying an aqueous chelator solution to the surface in contact with the calcium alginate plus colorant solution. Once again, water may subsequently be applied to the coated surface as a washing step.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents

We claim:

1. A removable coating composition for a surface, comprising:
    a solution of a polyion comprises at least one of alginate, a charged polysaccharide, polystyrene sulfonate, polyvinyl pyridine hydrochloride, and poly acrylate sodium salt; and
    a solution containing an oppositely charged multi-valent ion comprises at least one of divalent metal ions and organic ions.

2. The removable coating of claim 1, further comprising a colorant.

3. The removable coating of claim 2, wherein the colorant is covalently bound to the polyion.

4. The removable coating of claim 2, wherein the colorant is non-covalently bound to the polyion.

5. An X-alginate coating composition for a surface, comprising:
    an aqueous solution of sodium alginate including a colorant; and
    an aqueous solution containing divalent cations comprise one of Calcium chloride, Calcium chlorate, Calcium carbonate, Magnesium chloride. Magnesium chlorate and Magnesium carbonate,
wherein X comprises one of calcium, magnesium, manganese, iron, zinc, mercury, and non-metal ions.

6. The coating composition of claim 5, wherein the non-metal ion is paraquat.

7. The X-alginate coating composition of claim 5, comprising a pre-application combined mixture of the aqueous solution of sodium alginate and the aqueous solution containing divalent cations.

8. The X-alginate coating composition of claim 5, comprising a post-application combined mixture of the aqueous solution of sodium alginate and the aqueous solution containing divalent cations.

9. The X-alginate coating composition of claim 5, comprising a thin film coating.

10. The X-alginate coating composition of claim 9, wherein the thin film has a thickness about equal to or greater than 10 nanometers.

11. The X-alginate coating composition of claim 9, comprising a plurality of monolayers.

12. The X-alginate coating composition of claim 11, consisting of two monolayers.

13. The X-alginate coating composition of claim 11, wherein any one of the plurality of monolayers has a thickness about equal to or greater than 5 nanometers.

14. The X-alginate coating composition of claim 5, characterized in that the colored coating is substantially removable from the surface on-demand upon the application of a suitable chelator.

15. The X-alginate coating composition of claim 5, wherein the aqueous solution of sodium alginate has a concentration between one millimolar and saturation.

16. The X-alginate coating composition of claim 5, comprising an aqueous solution of calcium alginate having a concentration between one millimolar and saturation.

17. A coating composition remover for removing a coating composition that includes a solution of a polyion and a solution containing an oppositely charged multi-valent ion wherein the remover has a molecular structure sufficient to disrupt an ionic bond that cross-links the polyion and the multi-valent ion together wherein the remover comprises at least one of Sodium citrate, disodium ethylenediamine tetraacetate (EDTA), ethylene glycol teterracetic acid (EGTA), polyvinylacetate, and Sodium thioglycolate.

18. The coating composition of claim 17, wherein the remover comprises at least one of a chelating agent, an excess monovalent counterion, an absorbant, and an ion sequestration agent.

19. The coating composition of claim 17, wherein the EDTA remover is in the form of an aqueous solution of EDTA having a concentration between about 0.005 millimolar and saturation.

20. A method for producing a removable coating, comprising:
    combining a polyanion comprises at least one of alginate, a charged polysaccharide, polystyrene sulfonate, polyvinyl pyridine hydrochloride, and poly acrylate sodium salt, and an oppositely charged multi-valent species comprises at least one of divalent metal ions and organic ions.

21. The method of claim 20, further comprising:
    adding a covalently-bonded colorant to the polyanion.

22. The method of claim 20, further comprising:
    adding a non-covalently-bonded colorant to the polyanion.

23. A method for reversibly coloring a surface, comprising:
    applying an aqueous solution of sodium alginate including a colorant onto the surface; and
    applying an aqueous solution containing divalent cations onto the surface,
wherein the solutions are in mutual contact on the surface.

24. The method of claim 23, further comprising:
    applying the aqueous solution containing divalent cations onto the surface and subsequently applying the aqueous solution of sodium alginate including the colorant onto the surface.

25. The method of claim 23, further comprising:
    applying the aqueous solution of sodium alginate including the colorant onto the surface and subsequently applying the aqueous solution containing divalent cations onto the surface.

26. The method of claim 23, further comprising:
    combining the aqueous solution of sodium alginate including a colorant and the aqueous solution containing divalent cations; and
    subsequently applying the combination solution to the surface within a predetermined period of time.

27. The method of claim 23, further comprising:
    substantially simultaneously applying the aqueous solution of sodium alginate including the colorant and the aqueous solution containing divalent cations onto the surface.

28. The method of claim 23, wherein applying at least one of the aqueous solution of sodium alginate including a colorant and the aqueous solution containing divalent cations to the surface includes at least one of an application method of spraying, painting, pouring, coating, dipping, and dunking.

29. The method of claim 23, further comprising subsequently applying an aqueous chelator solution to the surface in contact with the sodium alginate and divalent cation solutions.

30. The method of claim 29, further comprising subsequently applying an aqueous solution of EDTA to the surface.

31. The method of claim 29, further comprising subsequently applying an aqueous solution of EGTA to the surface.

32. The method of claim 29, further comprising subsequently applying an aqueous solution of sodium citrate to the surface.

33. The method of claim 29, further comprising subsequently applying water to the surface.

* * * * *